Figure 1:
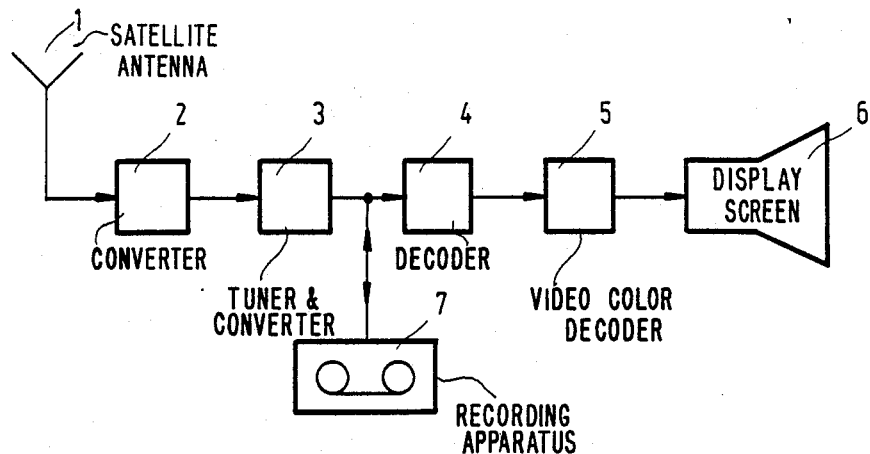

United States Patent [19]

Hegendörfer

[11] Patent Number: 4,823,385
[45] Date of Patent: Apr. 18, 1989

[54] SYSTEM FOR PROCESSING CODED INFORMATION

[75] Inventor: Max Hegendörfer, Forchheim, Fed. Rep. of Germany

[73] Assignee: U.S. Philips Corporation, New York, N.Y.

[21] Appl. No.: 131,781

[22] Filed: Dec. 11, 1987

[30] Foreign Application Priority Data

Dec. 13, 1986 [DE] Fed. Rep. of Germany ....... 3642629

[51] Int. Cl.⁴ .............................................. B04K 1/00
[52] U.S. Cl. ...................................... 380/10; 380/16; 380/20
[58] Field of Search .............................. 380/10, 16, 20

[56] References Cited

U.S. PATENT DOCUMENTS

| | | | |
|---|---|---|---|
| 4,325,078 | 4/1982 | Seaton et al. | 380/16 |
| 4,471,163 | 9/1984 | Donald et al. | 380/23 |
| 4,599,489 | 7/1986 | Cargile | 380/25 |
| 4,613,901 | 9/1986 | Gilhousen et al. | 380/20 |
| 4,644,493 | 2/1987 | Chandra et al. | 380/22 |
| 4,739,510 | 4/1988 | Jeffers et al. | 380/20 |

Primary Examiner—Salvatore Cangialosi
Attorney, Agent, or Firm—Marianne R. Rich

[57] ABSTRACT

A system for processing coded information is disclosed. A receiver receives coded information from a source. The receiver is equipped with a decoder and a real time clock. The coded information is decoded only when the time signal from the real time clock is within a given time interval. The coded information contains a source time signal and a time interval signal. A means for comparing the source time signal with the real time signal determines if the real time is within the time interval, and, if it is, a means for decoding will decode the coded information.

11 Claims, 1 Drawing Sheet

SYSTEM FOR PROCESSING CODED INFORMATION

The invention relates to a system for processing coded information having the features described in the precharacterizing part of claim 1.

A system of this type is essentially known from U.S. Pat. No. 4,325,078. This patent describes a so-called "Pay Per View"-television system in which only an appropriately equipped receiver can decode the transmitted programmes so that they can be viewed on the display screen in a decoded form. The known receiver has a converter for converting the transmitted signal into a form suitable for use in the subsequent circuit arrangements of the receiver. This converter is only activated when the actual time generated in a reference signal generator 30 present in the receiver is within a given time interval. The information determining this given time interval is recorded in a suitable form on a magnetic card or a magnetic tape which is made available to the user in return for payment of a fee. The magnetic card or magnetic tape is inserted in an opening in the receiver. The signals recorded on the magnetic card (the magnetic tape) which in addition to the above-mentioned given time interval also contain information on user identification and on the maximum permitted decoding time are read by a magnetic head and checked for authorisation.

However, the known system has drawbacks. On the one & hand the manufacture and exchange of the magnetic card or the magnetic tape is cumbersome and time-consuming. Moreover, programmes which can be viewed on the display screen can also be recorded and re-recorded or copied in a decoded form in the known system, so that copies of the decoded programme can be filed for an arbitrarily long time and viewed frequently. Consequently, in the known system it is only possible to prevent decoding of received programmes for viewers who do not have a valid magnetic card. Viewers who have a valid magnetic card can decode, copy and arbitrarily often view the programmes.

It is an object of the invention to provide a system of the type described in the pre-characterizing part of Claim 1 in such a way that the above-described drawbacks are obviated. Furthermore, it is an object of the invention to provide a system by means of which it can be individually decided for each programme if, when and how long a coded recorded programme can be broadcast in a decoded form. The system according to the invention thus also makes it possible to decode the coded recorded programme in a transmitter determined limited time interval differing from the actual broadcasting time of the programme and to prohibit it for all other time intervals.

This object is solved by the characteristic features stated in claim 1. Advantageous embodiments of the invention are stated in the sub-claims.

The invention particularly provides the advantage that the decoder at the receiver end can be substantially arbitrarily influenced by a signal from the transmitter in the system according to the invention.

Thus, it is for example possible to permit decoding of newly released motion pictures only during their & broadcasting time. It is true that these pictures may be recorded, but only in a coded form. A decoded display of these pictures at a later stage is not possible.

The system according to the invention also provides the possibility of decoding previously released motion pictures during their broadcasting time and to permit possibly planned recordings to be displayed in a decoded form within a time interval (for example three days) which can be determined by the broadcasting station (so-called "recording with expiry date").

Finally, the system according to the invention provides the possibility of decoding, for example, old motion pictures during their broadcasting time and to display possible copies of these pictures in a decoded form for an arbitrarily long time and as often as is desired.

Further advantageous properties of the system according to the invention will now be described with & reference to an embodiment which is shown in greater detail in FIGS. 1 and 2.

FIG. 1 shows a circuit diagram to explain the operation of the system according to the invention. FIG. 2 shows a detailed circuit diagram of the decoder 4 of FIG. 1.

According to FIG. 1 a coded satellite television signal is transmitted by a satellite transmitter (not shown) via a satellite transmission path is received by means of the satellite antenna 1. Alternatively, the received signal may of course be transmitted through a cable.

This coded satellite television signal not only comprises picture information and possibly sound information in a coded form, but also information about the actual time corresponding to the broadcasting time of the instantaneously broadcast programme. This time information may either be also coded or may be present in a non-coded form. The satellite television signal also comprises information about a time interval determined by the broadcasting station, within which time interval the decoder 4 can be activated. Furthermore, & the satellite television signal comprises information about the fact whether a time comparison is to be effected or not effected in the receiver.

This coded satellite television signal is applied to a first converter 2 (a so-called outdoor unit) and converted therein into a first intermediate frequency. This signal reaches the unit 3 of the receiver shown, comprising a tuner and a second converter. The coded satellite television signal is present as an FBAS or baseband signal at the output of this second converter. This signal can be recorded in a coded form by means of a recording apparatus 7.

The output signal of the second converter 3 reaches a decoder 4 whose structure and function will be described in greater detail with reference to FIG. 2.

The FBAS or baseband signal comprising inter alia the picture and sound information of the signal in a coded form is applied to the input of the decoder shown in Figure & 2. This signal either originates from the unit 3 or from the recording apparatus 7 according to FIG. 1.

If the signal originates from the unit 3, the transmitted time information relates to the real time during which the programme is broadcast. However, if the signal originates from the recording apparatus 7, the transmitted time information relates to the actual time of recording and not to the actual time of display.

This signal is applied to a selection circuit 41 in which those parts are separated from the satellite signal which are significant for the manner of functioning of the decoder. Thus, the coded picture and sound information is present at the output A of the selection circuit 41, the output B conveys information about the fact whether the time of the real time clock 43 should be compared with the time supplied by the source (transmitter or recording apparatus) and within which time interval a third converter 42 may be activated, and the output C conveys information in a coded or non-coded form about the time supplied by the source.

A control signal for setting and actuating the real & time clock 43 may be available at the output D. This control signal for setting and actuation of the real time clock 43 may only be used for the real time clock when there is no recording, because otherwise this control signal would be recorded along with the programme and would erroneously set back the real time clock if the recorded programme were displayed at a later stage. For example, the control signal could set the real time clock 43 at an instant when the broadcasting station either does not present any programmes (for example at night) or at an instant when information is & broadcast which is not worth recording. Alternatively, the signal path of the control signal D may be interrupted by an arbitrary signal which is only present during recorder playback so as to render an unwanted setback of the real time clock 43 impossible in the case of recorder playback.

The coded picture and sound signal present at the output A of the selection circuit 41 is applied to the third & converter 42 and decoded by this converter whenever a given control signal is supplied by a comparator 44. If the given control signal is not supplied, the coded input signal of the third converter 42 is either blocked or is passed on in an unchanged form. The output signal of the third converter 42 is applied to the video/colour decoder 5 of FIG. 1, converted into RGB signals and displayed on the display screen 6.

Figure 2:
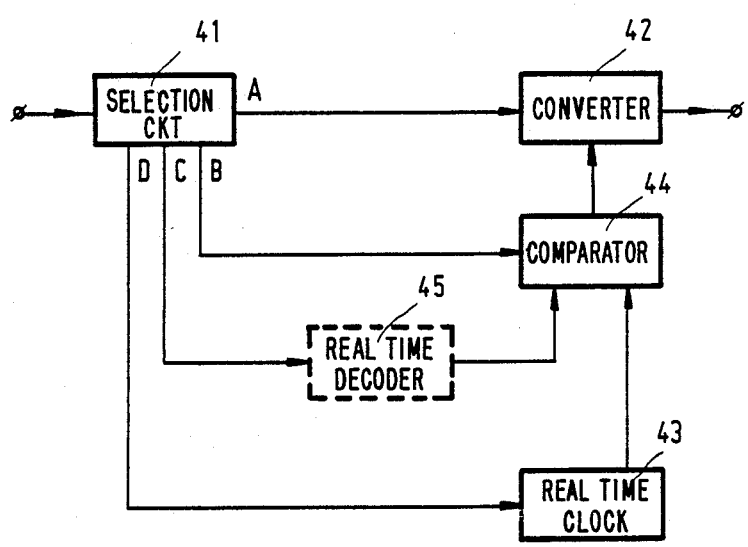

The signal present at the output B of the selection circuit 41 is applied to the comparator 44 of FIG. 2. This signal comprises information about the fact whether a time comparison is to be effected or not.

If no time comparison is to be effected, the comparator 44 each time supplies an output signal on the basis whereof the third converter decodes the coded picture and sound signal supplied thereto.

If a time comparison is to be effected, the comparator 44 compares the time information supplied by the real time clock 43 with the time information separated from the input signal of the selection circuit 41 and being & available at its output C, which information - in so far as it was transmitted in a coded form - is applied to the comparator 44 via a real time decoder 45, which is shown in broken lines.

The real time clock 43 is advantageously set and actuated by a control signal supplied by the transmitter, which signal is incorporated in the input signal of the selection circuit 41 and is applied to the real time clock 43 via its output D. This measure prevents a user from unauthorized activation of the third converter 42 by & tampering with the real time clock 43. As already described hereinbefore, it must of course be ensured that this control signal is not recorded along with the programme or cannot set back the real time clock in the case of recorder playback.

The comparator 44 supplies an output signal activating the third converter 42 whenever the difference between the two periods of time supplied thereto is within a & given time interval. The information determining this time interval is applied to the comparator by means of the signal which is present at the output B of the selection circuit 41. This information - likewise as the other information which is present at the outputs A to C of the selection circuit - is given by the broadcasting station. This is of course also the case if the input signal of the selection circuit 41 originates from the recording apparatus 7 because in this case not only the coded picture and sound information but also the signals present at the outputs B and C of the selection circuit 41 are recorded.

The time interval determined by the broadcasting station may advantageously be selected to be different for each programme which is broadcast. The given time interval may be, for example so small that the programme received via the satellite antenna 1 can be displayed on the display screen in a decoded form during the broadcasting period, but a possibly previously made recording cannot be decoded because the time comparison effected during playback of the recording yields an unduly large time difference. Furthermore, the given time interval may also comprise one day, one week or any further time intervals. The system described also provides the possibility of permitting a programme to be decoded in an arbitrary period of time, for example one month after the broadcast date. In the latter example the programme cannot be immediately viewed on the display screen, but it is possible to display previously made recordings in a decoded form at a later stage.

What is claimed is:

1. A system for processing coded information, in which a receiver receives coded information from a source and is equipped with a real time clock which generates a real time signal and a decoder (4) to decode the coded information only when the real time signal of the real time clock is in a given time interval, characterized in that:

the coded information also comprises a source time signal;

the coded information contains a time interval signal corresponding to the given time interval;

means for comparing the source time signal in the coded information with the real time signal of the real time clock (43) of the receiver, and producing a comparison signal corresponding to the time difference between the source time signal and the real time signal; and means for decoding the coded information only when the comparison signal indicates that the time determined by the real time clock (43) of the receiver is within the given time interval.

2. A system as claimed in claim 1, characterized in that the source time signal in the coded information is transmitted in a coded form and is decoded in the decoder (4).

3. A system as claimed in claim 1, wherein said source signal originates from a transmitter for at least one time period and further comprising means for setting and actuating the real time clock (43) from the transmitter to accord with the source time signal only when the source time signal is being received.

4. A system as claimed in claim 1, characterized in that the means for comparing the source time signal with the real time signal is controlled by the source signal and is effected optionally.

5. A system as claimed in claim 1, characterized in that the coded information comprises satellite signals.

6. A system as claimed in claim 1, characterized in that the coded information is at least one of a plurality of broadcast programmes and the given time interval is individually assigned to each individual broadcast programme.

7. A system as claimed in claim 1, characterized in that the coded information is recorded in a coded form on a record carrier producing a recorded programme.

8. A system as claimed in claim 7, characterized in that the given time interval determines a period of time in which the recorded programme may be decoded.

9. A system for processing coded information from a source comprising:
   coded information produced by said source;
   a source time signal produced by said source;
   a time interval signal produced by said source and representing a given time interval;
   a receiver for receiving said coded information, said source time signal and said time interval signal; said receiver comprising:
   a decoder for decoding said coded information;
   a real time clock producing a real time signal representative of real time;
   means for comparing said source time signal with said real time signal and producing a comparison signal which is representative of a time difference between said source time signal and said real time signal;
   means for comparing said time interval signal with said comparison signal and generating a first output when said time difference is greater than said given time interval or a second output when said time difference is less than said given time interval;
   means for applying said first and second outputs to said decoder;
   means for deactivating said decoder when said first output is applied to said decoder; and
   means for activating said decoder when said second output is applied to said decoder whereby said coded information is decoded when said comparison signal indicates that said time difference is less than said given time interval.

10. The system of claim 9 wherein:
    said time interval signal represents at least an earliest time that said coded information may be decoded; and
    said earliest time is later than said real time represented by said real time signal.

11. A method for processing coded information from a source comprising:
    providing coded information:
    providing a source time signal representing time relating to the source;
    providing a time interval signal representing a given time interval;
    providing a real time signal representing real time;
    comparing said source time signal with said real time signal and producing a comparison signal representing a time difference between said source time signal and said real time signal;
    comparing said time interval signal with said comparison signal and generating a first output when said time difference is greater than said given time interval or a second output when said time difference is less than said given time interval;
    applying said first and second outputs to a decoder;
    deactivating said decoder when said first output is applied to said decoder; and
    activating said decoder when said second output is applied to said decoder.

* * * * *

UNITED STATES PATENT AND TRADEMARK OFFICE
CERTIFICATE OF CORRECTION

PATENT NO.    : 4,823,385
DATED         : April 18, 1989
INVENTOR(S)   : MAX HEGENDORFER It is certified that error appears in the above-identified patent and that said Letters Patent is hereby corrected as shown below:

On the title page, item [73] Assignee: "U.S. Phillips Corporation, New York, N.Y." should read --Grundig E.M.V. Elektro-Mechanische Versuchsanstalt, Max Grun Dig Holland Stiftung & Co. KG, Furth/Bayern, Germany--

Signed and Sealed this

Twenty-eighth Day of November 1989

Attest:

JEFFREY M. SAMUELS

Attesting Officer            Acting Commissioner of Patents and Trademarks